(12) United States Patent
Arcand

(10) Patent No.: US 7,612,293 B2
(45) Date of Patent: Nov. 3, 2009

(54) INSULATOR ARRANGEMENT

(75) Inventor: Sebastien Arcand, St. Augustin-de-desmaures (CA)

(73) Assignee: General Electric Canada, Mississauga, Ontario (CA)

( * ) Notice: Subject to any disclaimer, the term of this patent is extended or adjusted under 35 U.S.C. 154(b) by 0 days.

(21) Appl. No.: 11/567,432

(22) Filed: Dec. 6, 2006

(65) Prior Publication Data

US 2007/0131442 A1 Jun. 14, 2007

(30) Foreign Application Priority Data

Dec. 9, 2005 (CA) .................................. 2529144

(51) Int. Cl.
  *H01B 17/00* (2006.01)
(52) U.S. Cl. ............................... 174/138 F; 174/138 R; 174/169; 174/171; 174/99 B; 248/62
(58) Field of Classification Search ............. 174/138 F, 174/138 R, 169, 171, 99 B, 149 B, 133 B, 174/129 B; 248/74 R, 62
  See application file for complete search history.

(56) References Cited

U.S. PATENT DOCUMENTS

| 2,396,131 A |   | 3/1946 | Scott, Jr. |   |
|---|---|---|---|---|
| 2,889,396 A |   | 6/1959 | Boden et al. |   |
| 3,073,891 A |   | 1/1963 | Barengoltz |   |
| 3,809,801 A | * | 5/1974 | Niemoller et al. | 174/99 B |
| 4,215,237 A | * | 7/1980 | Burtnett | 174/99 B |
| 4,379,945 A |   | 4/1983 | Zwillich |   |

* cited by examiner

*Primary Examiner*—Dhiru R Patel
(74) *Attorney, Agent, or Firm*—Global Patent Operation; Douglas D. Zhang

(57) ABSTRACT

An insulator arrangement for supporting a conductor with an enclosure has an insulator fixedly connected at one end with the conductor. The insulator has another end portion mounted to a first shock absorber. The first shock absorber is further mounted with an access cover to permit displacement of the conductor and the insulator relative to the access cover. The insulator arrangement has second shock absorbers mounting the access cover to the enclosure permitting relative displacement between the access cover, which supports the insulator and conductor, and the enclosure.

15 Claims, 2 Drawing Sheets

INSULATOR ARRANGEMENT

FIELD OF THE INVENTION

The present invention relates to an insulator arrangement suitable for use in isolated phase bus duct for supporting a conductor relative to a bus duct enclosure.

BACKGROUND OF THE INVENTION

Insulators currently used for supporting a conductor within an enclosure, such as, for example, isolated phase bus duct, are supported by an aluminum plate that is in turn bolted to wings welded to the inside of the enclosure. The conductor is mounted to the insulator by a bolt that passes through the conductor and the central axis of the conductor. In the event of a short-circuit condition, a force is applied to the conductor of each phase of the bus ducts that tries to move the conductor to a zero force line. Because the insulators are typically made from ceramic compositions, they are less able to withstand the shearing action associated with the movement to the zero force line than the compressive load to which the insulators are normally subjected. These forces are greater than those that can be compensated for by any inherent flexibility in the aluminum plate to which the insulator is mounted. As a result, mechanical force formulas have been developed to determine the maximum span or distance between insulators along each bus duct run. For high short-circuit requirements, the span between insulators is relatively small so as to maintain the conductor in place and prevent the conductor from moving to the zero force position and potentially damaging the insulators. This results in a rather expensive bus duct configuration using many insulators.

U.S. Pat. No. 2,396,131 issued to Scott, Jr. discloses a bus bar support where insulators are provided with a universal ball and socket type joint to compensate for movement of the conductor relative to the enclosure due to thermal expansion and contraction of the conductor. However, this patent discloses four such insulators for each connection point with the enclosure. Hence many insulators are required giving rise to an expensive bus duct configuration. Further, the insulator is reinforced at the universal joint with a steel bearing sleeve threaded into the insulator that nests in the insulator a spring washer to provide the socket portion of the universal joint. This configuration is costly to manufacture.

Accordingly, there is a need for an insulator arrangement that addresses forces associated with short-circuit conditions and the stress placed on the insulator during such short-circuit conditions.

BRIEF DESCRIPTION OF THE INVENTION

The present invention relates to an insulator arrangement for supporting a conductor with a support member. The insulator arrangement comprises an insulator having a connector extending from one end portion thereof for fixed connection with the conductor. The insulator has another end portion mounted to a first shock absorber. The first shock absorber is further mounted with the support member to permit displacement of the conductor and the insulator relative to the support member.

The first shock absorber permits the insulator to move when the conductor moves towards the zero force position in the event of short-circuit conditions thereby reducing the stress requirements of the insulator. As a result, fewer insulators are required to mount the conductor relative to the support member.

In one embodiment the conductor is cylindrical and the support member comprises an enclosure surrounding the cylindrical conductor, such as for example, an isolated phase bus duct. The support member further comprises an access opening closed by an access cover. The first shock absorber is mounted with the access cover to provide displacement of the conductor and the insulator relative to the access cover. The insulator arrangement further comprises second shock absorbers mounting the access cover to the enclosure and permitting relative displacement between the access cover and the enclosure.

By utilizing first and second shock absorbers, the stress placed on the insulators is further reduced over the use of only the first shock absorber.

BRIEF DESCRIPTION OF THE DRAWINGS

For a better understanding of the nature of the present invention reference may be had by way of example to the accompanying diagrammatic drawings in which.

DETAILED DESCRIPTION OF THE INVENTION

The present invention relates to an insulator arrangement suitable for use in isolated phase bus duct for supporting a conductor relative to a bus duct enclosure.

Figure 1:
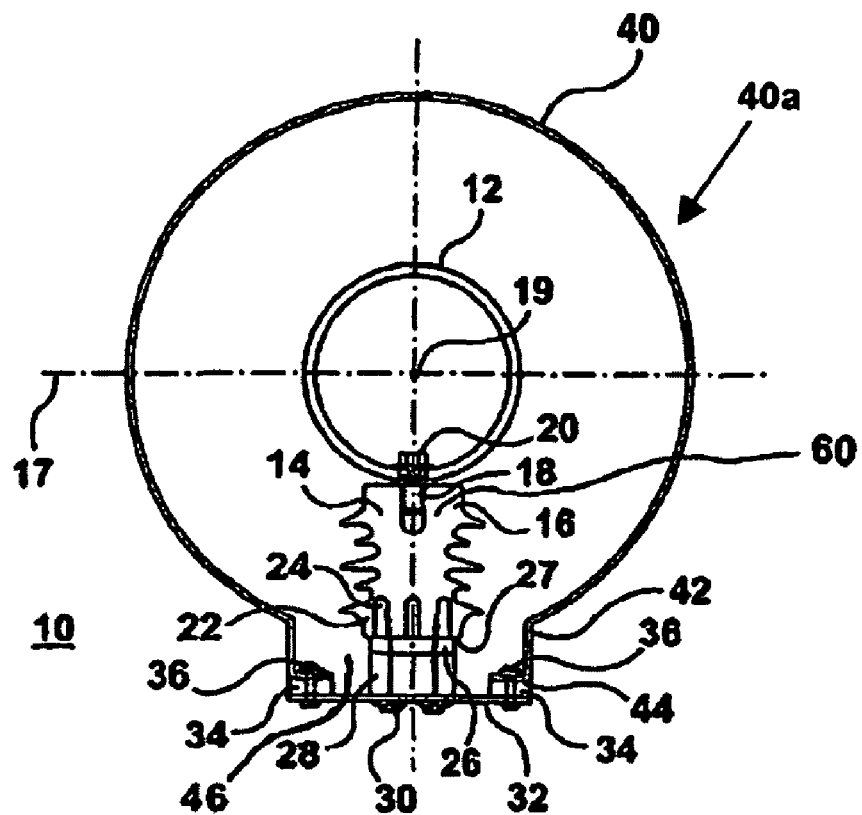
FIG. 1 is a side view of an embodiment of the insulator arrangement for the present invention.
Figure 2:
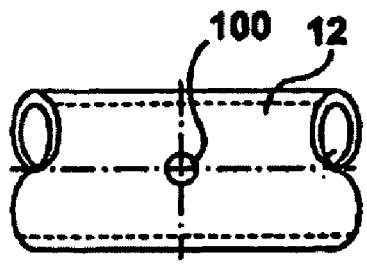
FIG. 2 is a view of a portion of the conductor having a circular aperture.
Figure 3:
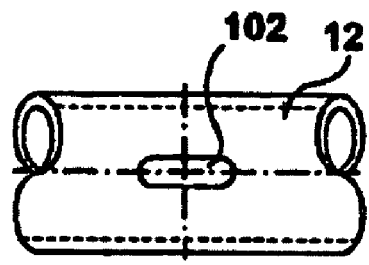
FIG. 3 is a view of a portion of the conductor having a slotted aperture.

Referring to FIG. 1, there is shown an insulator arrangement 10 for supporting a cylindrical conductor 12 relative to a bus duct support member 40a including an enclosure 40 that surrounds the conductor 12. The conductor 12 is mounted in a manner which allows it to move towards a zero force position either to the left or right along line 17 or along the axis 19 of the conductor 12. The conductor in this arrangement is also capable of limited vertical movement. The mounting provided by the insulator arrangement comprises an insulator 14 having one end 60 journalled with a threaded stud 18 that is threaded into a nut 20 secured on an inside wall surface of conductor 12. The threaded stud 18 passes through either an opening 100 in conductor 12, as shown in FIG. 2, or slotted opening 102 as shown in FIG. 3. The opening 100 provides for a fixed insulator arrangement whereas the opening 102 provides for a slip insulator arrangement relative to the conductor 12.

The other end 22 of the insulator 14 is secured by bolt 24 to a shock absorber 26 and a spacer 28. The spacer 28 is in turn affixed by bolts 30 and access cover 32 such that cover 32 supports the conductor 12 and insulator 14 with the enclosure 40. The shock absorber 26 is a first or interior shock absorber that may comprise a flexible material such as silicone or alternatively an assembly of a set of springs mounted between plates. The shock absorber 26 permits for relative movement of both the conductor 12 and insulator 14 relative to the access cover 32 and hence the enclosure 40. The spacer 28 is utilized to gauge the distance between the access cover 32 and the conductor 12. As shown in this embodiment the shock absorber 26 has a relatively flat surface 27 that abuts against insulator 14 and does not penetrate the insulator 14. The shock absorber 26 also abuts against the spacer 28.

The enclosure 40 surrounds the conductor 12 and has a cylindrical wall 42 that define an access opening 46. The access opening 46 is closed by access cover 32. The cylindrical wall 42 has in-turned flanges 44. A second shock absorber arrangement in the form of two shock absorbers 34 are mounted between the access cover 32 and the in-turned flanges 44 of the enclosure 40 in abutting relation therewith. The access cover 32, shock absorbers 34 are mounted relative to the in-turned flanges 44 of the enclosure 40 by means of bolts and nuts 36. The second or exterior shock absorbers 34 comprise the same material or construction as that for the first shock absorber 26. The second shock absorbers 34 permit for the relative movement of the insulator 14 and conductor 12 relative to the enclosure 40 due to the relative movement permitted between the access cover 32 and the enclosure 40.

The first shock absorber 26 permits the insulator 14 to move when the conductor 12 moves towards the zero force position in the event of short-circuit conditions thereby reducing the stress requirements of the insulator 14. The second shock absorbers 34 permit relative movement between the access cover 32 and the enclosure 40 and hence the second shock absorbers 34 further reduce the stress placed on the insulator 14.

Figure 4:
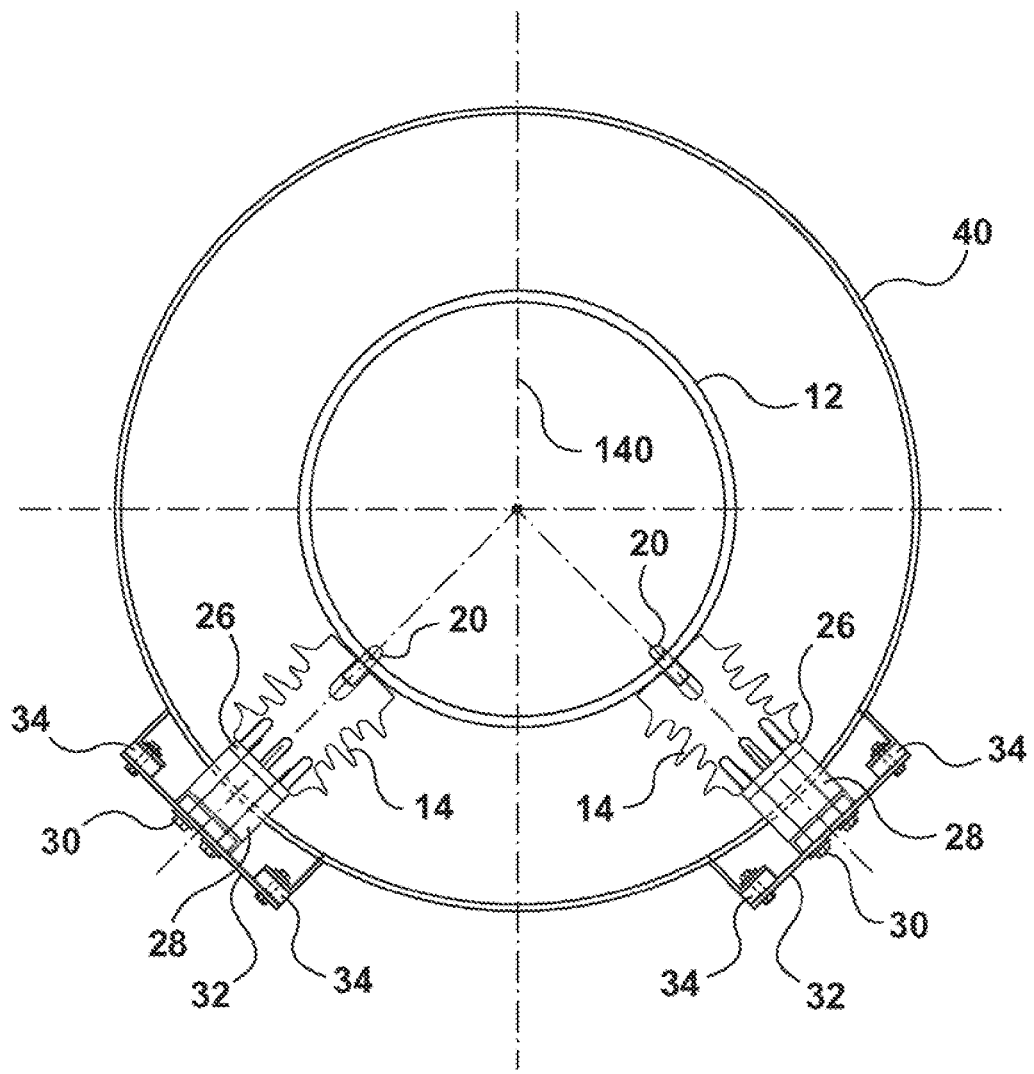
FIG. 4 is a view of another bus duct embodiment utilizing two insulator arrangements

Referring to FIG. 4, there is shown an embodiment for a larger sized conductor 12 in a bus duct enclosure 40. In this embodiment two insulator arrangements 10 are shown offset from vertical axis 140 by 45 degrees where each insulator 14 is offset from each other by 90 degrees. Two insulators 14 are utilized due to the size of the increased conductor 12 and associated currents that pass there along. All other features of the insulator arrangements are similar to those described for FIGS. 1 to 3.

While the invention has been described in terms of various specific embodiments, those skilled in the art will recognize that the invention can be practiced with modifications within the spirit and scope of the claims.

What is claimed is:

1. An insulator arrangement for supporting a conductor with a support member, the insulator arrangement comprising:
   a first shock absorber; and
   an insulator having a connector extending from one end portion thereof for fixed connection with the conductor, the insulator having another end portion mounted to the first shock absorber,
   wherein the support member comprises an enclosure surrounding the conductor, the enclosure having an access opening closed by an access cover, the first shock absorber being mounted with the access cover to provide displacement of the conductor and the insulator relative to the access cover, and
   wherein the insulator arrangement further comprises second shock absorbers mounting the access cover to the enclosure and permitting relative displacement between the access cover and the enclosure.

2. The insulator arrangement of claim 1 wherein the conductor is cylindrical.

3. The insulator arrangement of claim 2 wherein each of the first and second shock absorbers is one selected from the group consisting of a resilient material and springs.

4. The insulator arrangement of claim 2 wherein the first shock absorber is mounted at one side thereof to the insulator and at the other side thereof to a spacer, and the spacer being affixed to the access cover.

5. The insulator arrangement of claim 1 wherein the first shock absorber is mounted at one side thereof to the insulator and at the other side thereof to a spacer, and the spacer being mounted to the access cover.

6. The insulator arrangement of claim 1 wherein the conductor has an opening in which a retaining nut is located, and the connector comprises a threaded stud secured with the nut.

7. The insulator arrangement of claim 6 wherein the opening in the conductor comprises a slotted aperture along which the nut is adapted for movement.

8. The insulator arrangement of claim 1 wherein the first shock absorber has a first flat surface abutting the insulator and has a second opposing flat surface abutting a spacer, the spacer being affixed to the access cover.

9. The insulator arrangement of claim 1 wherein the enclosure further has a pair of opposing in-turned flanges at the access opening and the second shock absorbers abut respective in-turned flanges, the access cover abutting the second shock absorbers, bolts passing through the in-turned flanges to mount the second shock absorbers to the enclosure and the access cover.

10. An insulator arrangement for supporting a conductor, comprising:
    a support member comprising an enclosure surrounding the conductor, the enclosure having an access opening;
    an access cover for closing the access opening;
    a first shock absorber supported by the access cover;
    an insulator supported by the first shock absorber; and
    second shock absorbers mounting the access cover to the enclosure and permitting relative displacement between the access cover and the enclosure,
    wherein the conductor is supported by the insulator so that the conductor is displaceable relative to the access cover.

11. The insulator arrangement of claim 10 wherein the conductor is cylindrical.

12. The insulator arrangement of claim 11, further comprising a spacer affixed to the access cover, the first shock absorber being mounted at one side thereof to the insulator and at the other side thereof to the spacer.

13. The insulator arrangement of claim 12 wherein each of the first shock absorber and the second shock absorbers comprises a resilient material or a spring.

14. The insulator arrangement of claim 10, further comprising a spacer affixed to the access cover, the first shock absorber being mounted at one side thereof to the insulator and at the other side thereof to the spacer.

15. The insulator arrangement of claim 10 wherein the enclosure further has a pair of opposing in-turned flanges at the access opening and the second shock absorbers abut respective in-turned flanges, the access cover abutting the second shock absorbers, bolts passing through the in-turned flanges to mount the second shock absorbers to the enclosure and the access cover.

* * * * *